(12) United States Patent
Shadwell et al.

(10) Patent No.: US 10,023,373 B2
(45) Date of Patent: Jul. 17, 2018

(54) COLLATING STRIP FOR PLUG AND PLUG INSTALLATION METHOD

(71) Applicant: Handy & Harman, White Plains, NY (US)

(72) Inventors: Peter J. Shadwell, Longmeadow, MA (US); Richard L. Belinda, Westfield, MA (US); Timothy F. Gillis, Florence, MA (US)

(73) Assignee: Handy & Harman, White Plains, NY (US)

( * ) Notice: Subject to any disclaimer, the term of this patent is extended or adjusted under 35 U.S.C. 154(b) by 381 days.

(21) Appl. No.: 14/434,251

(22) PCT Filed: Oct. 9, 2013

(86) PCT No.: PCT/US2013/064017
§ 371 (c)(1),
(2) Date: Apr. 8, 2015

(87) PCT Pub. No.: WO2014/058962
PCT Pub. Date: Apr. 17, 2014

(65) Prior Publication Data
US 2015/0291330 A1    Oct. 15, 2015

Related U.S. Application Data

(60) Provisional application No. 61/711,244, filed on Oct. 9, 2012, provisional application No. 61/782,549, filed on Mar. 14, 2013.

(51) Int. Cl.
*B65D 85/24*    (2006.01)
*B65D 73/00*    (2006.01)
(Continued)

(52) U.S. Cl.
CPC ............ *B65D 73/0035* (2013.01); *B25C 7/00* (2013.01); *B65D 59/02* (2013.01); *F16B 27/00* (2013.01)

(58) Field of Classification Search
CPC ...... B65D 59/02; B65D 73/0035; B25C 7/00; F16B 27/00
(Continued)

(56) References Cited

U.S. PATENT DOCUMENTS 293,726 A * 2/1884 Fancher .............. E04G 23/0203
156/92
2,302,045 A * 11/1942 Neumann ............... G09F 5/042
206/348
(Continued)

OTHER PUBLICATIONS

International Search Report and Written Opinion dated Jan. 17, 2014 (PCT/US2013/064017).
(Continued)

*Primary Examiner* — Luan K Bui
(74) *Attorney, Agent, or Firm* — Alix, Yale & Ristas, LLP

(57) ABSTRACT

A collating strip for holding plugs prior to insertion of the plugs into a hole such as a screw hole or nail hole after the screw or nail has been driven. The collating strip comprises an elongated strip having a plurality of perforations spaced along its length; and a plug positioned in each of the perforations, each plug having an insertion end and an external end, the insertion ends projecting from said strip. The strips may be in sheet form of a plurality of strips side by side with an individual strip being separable from the remaining strips of the sheet.

23 Claims, 9 Drawing Sheets

(51) Int. Cl.
*B25C 7/00* (2006.01)
*B65D 59/02* (2006.01)
*F16B 27/00* (2006.01)

(58) Field of Classification Search
USPC ....... 206/338, 340, 341, 343, 345–348, 486, 206/490, 820; 29/428; 411/372.5, 373, 411/377, 508, 908, 369, 371.1; 220/787; 52/300, 301, 302.5, 302.7
See application file for complete search history.

(56) References Cited

U.S. PATENT DOCUMENTS

| | | | | |
|---|---|---|---|---|
| 3,578,200 A * | 5/1971 | Hetzer | ............... | B65D 39/0023 411/910 |
| 3,707,226 A * | 12/1972 | Wippermann | ......... | A47B 57/06 206/343 |
| 4,018,334 A * | 4/1977 | Lejdegard | ............... | F16B 27/00 206/346 |
| 4,823,978 A * | 4/1989 | Pufpaff | ................... | E04F 19/00 220/787 |
| 5,047,273 A * | 9/1991 | Ernst-Cox | .............. | A47B 95/00 206/307 |
| 5,112,175 A | 5/1992 | Wilkening | | |
| 5,470,184 A * | 11/1995 | Chandler | ............. | A47B 95/043 411/377 |
| 5,499,737 A * | 3/1996 | Kraus | .................. | F16B 21/086 138/89 |
| 5,509,768 A * | 4/1996 | Hon | ........................ | F16B 27/00 206/347 |
| 5,931,298 A | 8/1999 | Huang | | |
| 5,984,096 A * | 11/1999 | Shinjo | ..................... | F16B 27/00 206/346 |
| 6,047,738 A | 4/2000 | Andersson et al. | | |
| 6,116,835 A | 9/2000 | Blacket et al. | | |
| 6,745,530 B2 * | 6/2004 | Nesbitt | ................... | E04H 17/20 52/300 |
| 6,832,696 B2 | 12/2004 | Donner | | |
| 6,974,030 B1 | 12/2005 | Sundstrom | | |
| 7,520,385 B2 * | 4/2009 | Yu | .......................... | B65D 73/02 206/347 |
| 7,581,361 B1 * | 9/2009 | Murkland | ................. | E04B 1/72 220/800 |
| 8,919,606 B2 * | 12/2014 | Sato | ....................... | B62D 25/24 215/363 |
| 2006/0006087 A1 * | 1/2006 | Lin | ......................... | F16B 27/00 206/347 |
| 2006/0201957 A1 * | 9/2006 | Harrington | ............ | H02G 3/085 220/787 |
| 2007/0144924 A1 * | 6/2007 | Yamashita | ............. | B65D 71/70 206/338 |
| 2009/0188822 A1 | 7/2009 | Searle et al. | | |

OTHER PUBLICATIONS

Supplementary European Search Report dated Aug. 17, 2016 (European Application No. 13845133.1).

* cited by examiner

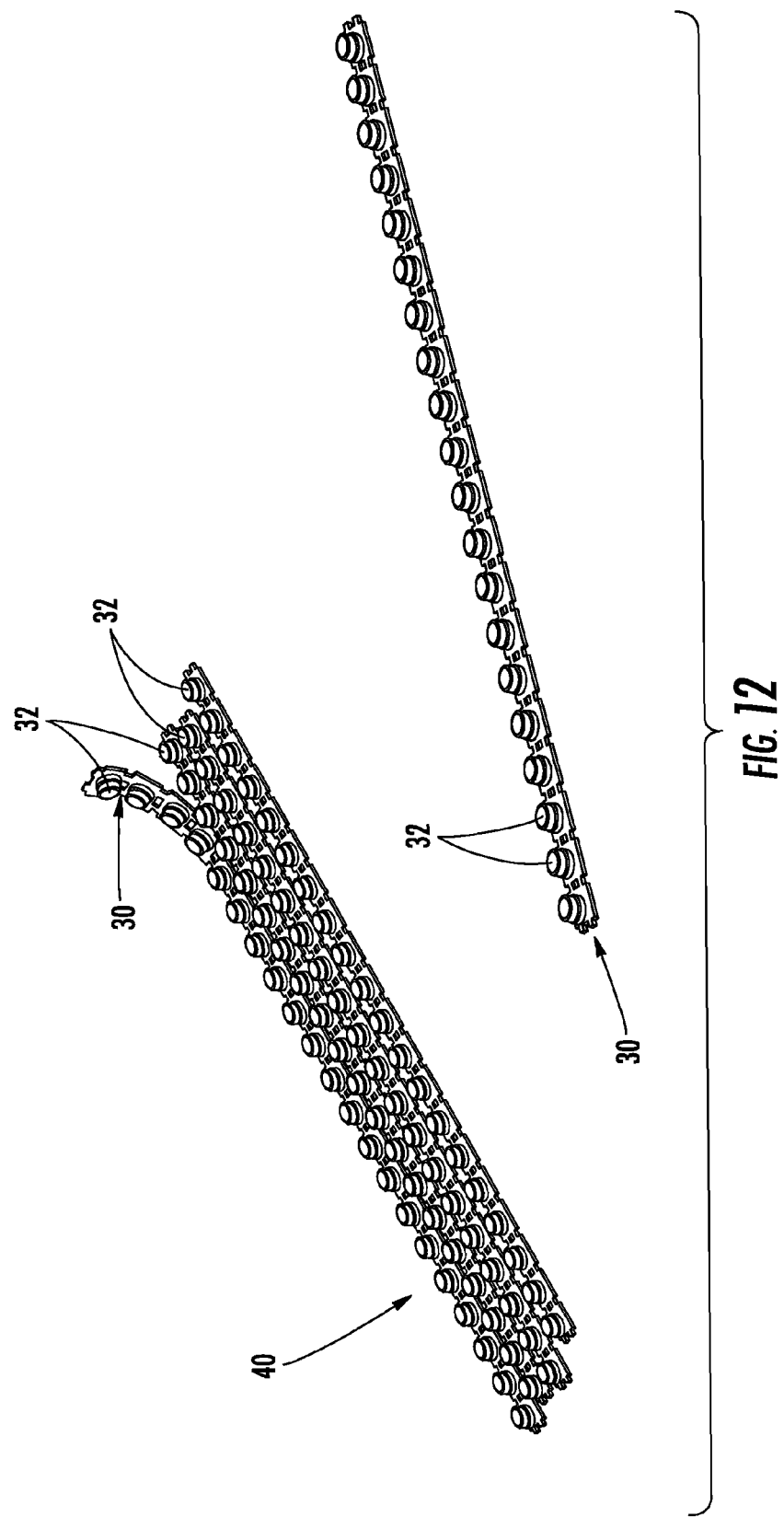

COLLATING STRIP FOR PLUG AND PLUG INSTALLATION METHOD

CROSS-REFERENCE TO RELATED APPLICATIONS

This application claims the priority of U.S. Provisional Application No. 61/711,244 filed Oct. 9, 2012 and U.S. Provisional Application No. 61/782,549 filed Mar. 14, 2013, the entire disclosures of which applications are incorporated herein by reference in their entirety.

FIELD OF THE INVENTION

The invention relates to plugs for filling recesses left by attachment openings in a surface, such as a screw or nail hole in trim, sheathing or a like item. More particularly, the invention relates to a collating strip to hold a plurality of plugs, a sheet of multiple collating strips and an automatic or semi-automatic method of installing plugs from the strip.

BACKGROUND

Plugs are commonly used to conceal holes formed for attaching trim or a similar building material with attachment holes (decking, sheathing, furniture, etc.). Numerous loose plugs are packaged together in a bag for individual handling and insertion into an attachment hole. This known method of packaging and handling carries numerous drawbacks. For example, the relatively small sized plugs are easily dropped and/or lost, attract dirt from one's fingertips, are challenging to position into a flush hole with one's fingertips, are difficult to isolate prior to use and are often difficult to position with proper grain orientation in the trim material. It would be useful to have a storage and delivery system that allows a quick and facile positioning, orientation and insertion of plugs with minimal or no direct handling of the individual plugs.

SUMMARY

According to one aspect there is provided a collating strip for holding plugs prior to insertion of the plugs into a hole such as a screw hole or nail hole after the screw or nail has been driven. The collating strip comprises an elongated strip having a plurality of perforations spaced along its length; and a plug positioned in each of the perforations, each plug having an insertion end and an external end, the insertion ends projecting from the strip.

According to another aspect there is provided a sheet of collating strips for holding plugs prior to insertion of the plugs into a hole such as a screw hole or nail hole after the screw or nail has been driven. The collating sheet comprises a sheet having spaced rows of longitudinal spaced perforations. A plug is positioned in each of said perforations, each plug having an insertion end and an external end, with the insertion ends projecting from the sheet. The rows are separable from each other to provide a single strip containing one longitudinal row of plugs.

According to yet another aspect there is provided a method of inserting plugs into holes such as screw holes or nail holes in a trim or the like after the screws or nails have been driven. The method comprises providing an elongated strip having a plurality of perforations spaced along its length, and a plug positioned in each of said perforations, each plug having an insertion end and an external end, the insertion ends projecting from said strip, positioning the strip over the holes so that at least one insertion end is aligned with a hole, pushing the plug into the hole, and removing the strip from the plug.

According to a further aspect there is provided a method of inserting plugs into a hole such as a screw hole or nail hole in a trim or the like after the screw or nail has been driven. The method comprises providing an elongated strip having a plurality of perforations spaced along its length and a plug positioned in each of the perforations, each plug having an insertion end and an external end, the insertion ends projecting from said strip; the strip having sets of opposed notches in its side edge, each set being spaced longitudinally between said perforations, positioning the strip into a track in a tool, the track having a front opening, the strip being positioned in said track with the insertion end of the plug extending out of said opening, the strip being positioned so that a plug is in alignment with an attachment member to drive the plug, positioning the tool over the hole so that the aligned plug is positioned over a hole in the trim activating the tool so that said attachment mechanism drives the plug into the hole and thereafter the tool advances the strip so that a new plug is aligned with the attachment member.

DESCRIPTION OF THE DRAWINGS

FIG. 12 depicts a typical detachment of an end strip from the adjacent strip in the sheet.

DESCRIPTION OF THE PREFERRED EMBODIMENT

With reference to the drawings wherein like numerals represent like parts throughout the Figures, a collated strip of plugs for use in concealing holes in trim or like structures and a corresponding method of installation is disclosed.

Figure 1:
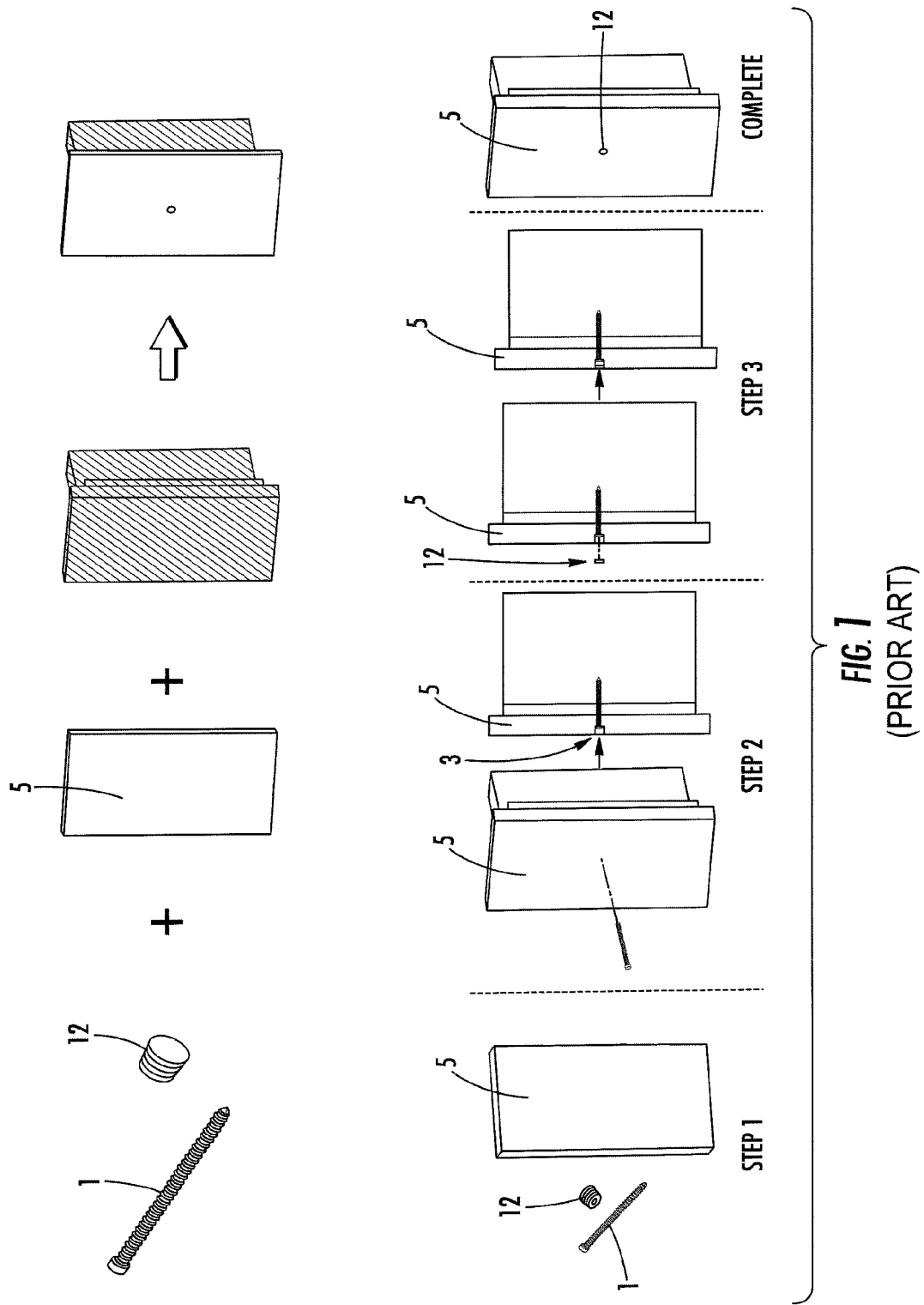
FIG. 1 is a general depiction of a prior art plug installation process and materials with which loose plugs are typically used.

FIG. 1 shows one currently employed method of trim installation, including the step of concealing the recess left by the screw hole with a loose plug 10 (typically having a matching surface to the surrounding trim 3 or like surface). The screw or nail 1 is installed by driving the screw or nail into the trim 3 leaving a bore 5 above its head. A plug 12 is placed into the bore and tapped in until its outer end face is flush with the outer surface of the exterior member such as trim 3.

Figure 2:
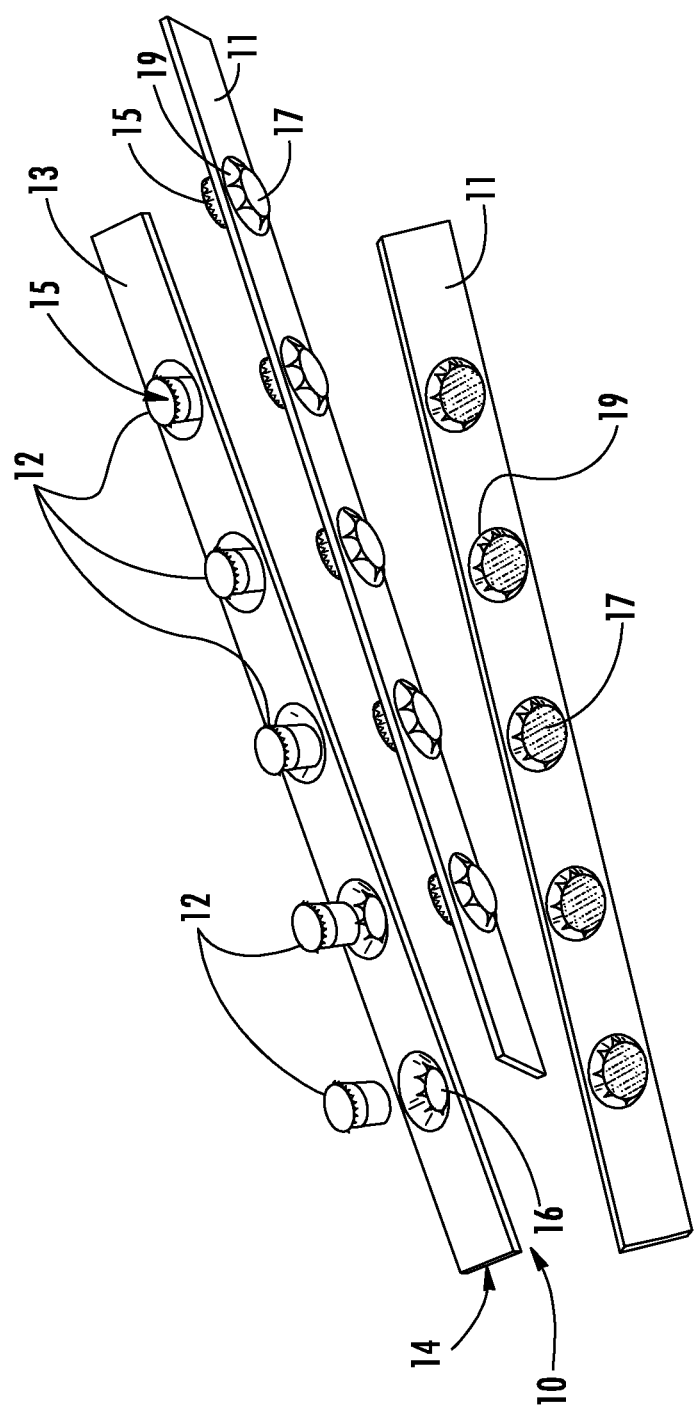
FIG. 2 is a perspective view of an embodiment of the disclosed collating strip for plugs.

FIG. 2 shows an embodiment of the disclosed collating plug strip 10 with a plurality of associated plugs 12 engaged with an elongate strip 14. The strip has an upper surface 11 and bottom surface 13. This embodiment of the plug strip 10 includes pre-punched perforations 16 at predetermined positions along the length of the elongate strip 14. Each perforation 16 is configured to rigidly or semi-rigidly engage a plug 12, as shown most clearly in the middle strip in FIG. 2. In a preferred embodiment, the strip 14 is a polymeric material that has a relatively translucent or clear appearance and is somewhat flexible (i.e. not a rigid plastic). However, additional strips may be made from paper, cardboard, cloth, or the like.

The plugs 12 have an insertion end 15 that is adapted to be inserted in the screw hole and an external end 17 having a finished end surface which is exposed when the plug 12 is inserted. The plugs 12 are inserted into the perforations 16 finished end surface first. The perforations 16 have their inner side edges 19 turned downward and inward as shown in FIG. 2 to frictionally grasp the plugs 12.

As shown best in the middle strip 10 of FIG. 2, the strip 14 and plugs 12 are engaged with at least a portion of the "insertion end" 15 of the plugs projecting from the bottom surface 13 of the strip 14. As shown in the bottom strip 10 of FIG. 2, the plugs 12 can be positioned in the strip 14 with the respective grains on the surface of the exposed end 17 being in alignment.

The collating strip 10 allows easy handling of numerous plugs 12 without the drawbacks discussed above. After attachment of a trim board or like member with a screw, a user can grip the strip 14 and position a plug 12 within the fastener recess/hole (with surface grains aligned). In the embodiment depicted in FIG. 2, a user can tap or otherwise push the plug 12 into the hole and then dislodge the strip 14. The separated plug 12 can be tapped additionally to effect a flush mating with the surface of the trim.

Embodiments of the disclosed strips 10 may be provided wherein the engaged plugs 12 are positioned at predetermined lengths along the strip 14 that substantially correspond to the positions of pre-cut holes or recesses in the trim surface. This configuration allows a user to align the plug strip 10 with numerous individual plugs 12 aligned with a separate recess, and then install the plugs 12 in a single step, without having to access or move the strips numerous times for the same trim surface.

Figure 3:
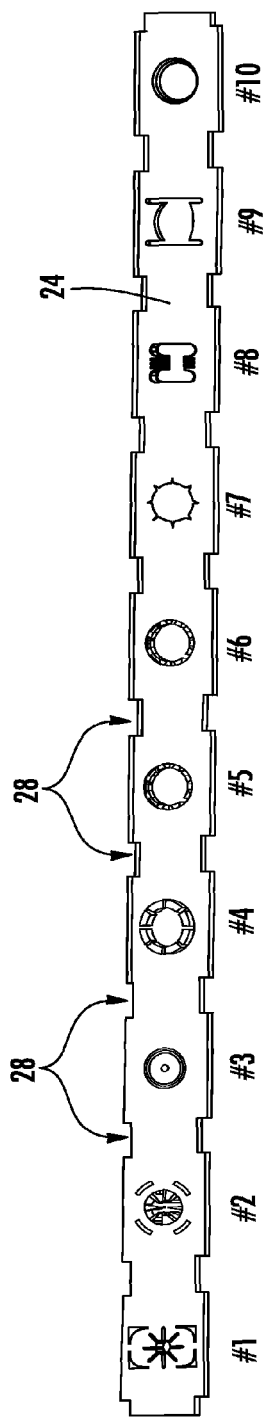
FIG. 3 shows another embodiment of the collating strip for plugs having edge notches for alignment with a surface and/or feeding with an attachment tool and showing various geometries of shapes for the perforations.
Figure 4:
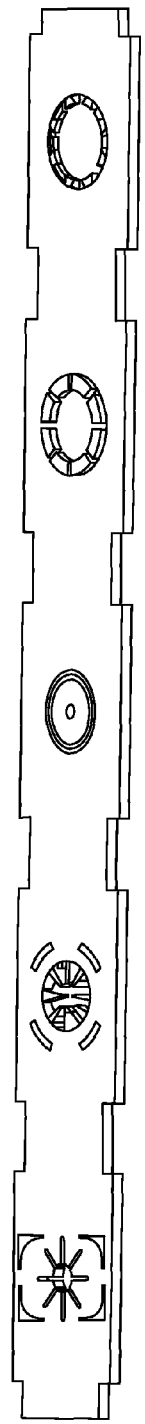
FIG. 4 shows a close up view of the strip of FIG. 3, depicting the various geometries of perforations.

FIGS. 3 and 4 depict an additional embodiment of a strip 24. As shown, this embodiment includes a plurality of spaced registry notches 28 spaced along each longitudinal edge of the strip 24. As will be discussed in further detail below, the registry notches 28 can assist alignment of the strip with a trim surface, and also assist in engagement with an automatic or semiautomatic feeding and attachment tool. FIGS. 3 and 4 also show numerous embodiments of perforations, indentations or holes in the substrate 24 that can be used to engage and maintain standard shaped plugs therewith. The perforations can also be shaped to adapt to numerous different shapes of plugs, if desired.

Figure 5:
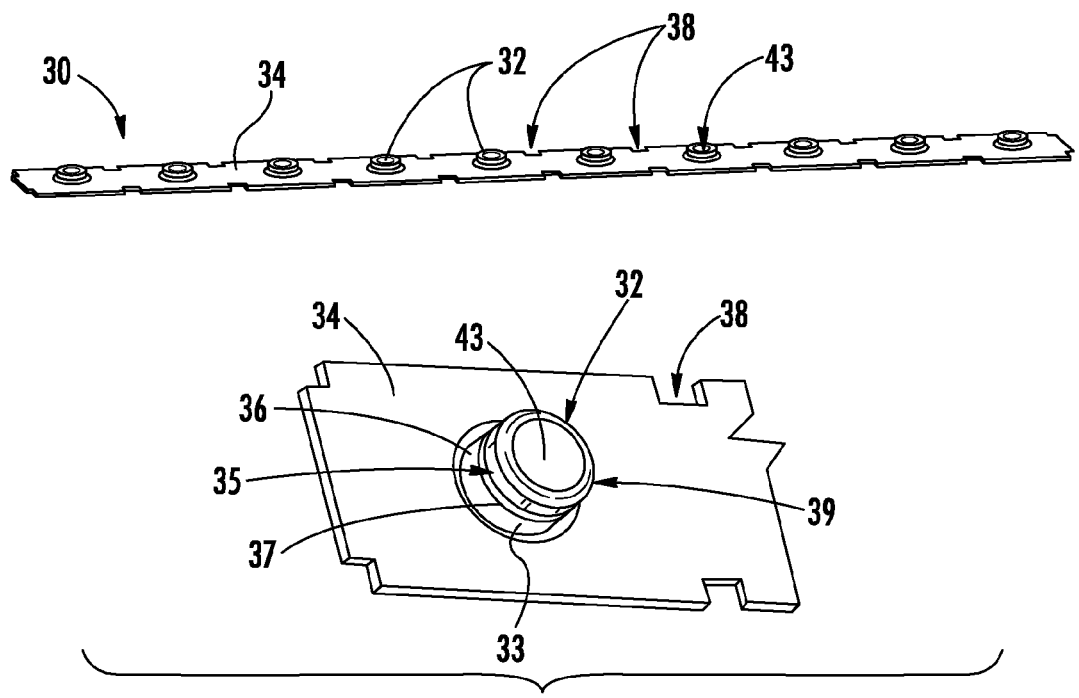
FIG. 5 shows a bottom perspective view of a collating strip for plugs according to one embodiment.

FIG. 5 shows the bottom side of another plug strip 30, which includes a plurality of plugs 32 engaged within perforations 26 in a notched strip 34. Typically, each registry notch 38 is positioned on a longitudinal edge of the strip 34 opposite a registry notch 38 on the opposite edge of the strip. The registry notches 38 are also typically spaced longitudinally a uniform distance from each other along the respective edges. In this embodiment, the strip 34 extends longitudinally with the perforations 36 and associated plugs 32 being positioned longitudinally between the registry notches 38. This relationship assists a more facile alignment and/or longitudinal advancement of the strip 30 on a surface or through an automatic feeding and attachment tool. The perforations 36 are preferably oval as shown particularly in FIG. 7 although other shapes may be used.

Figure 10:
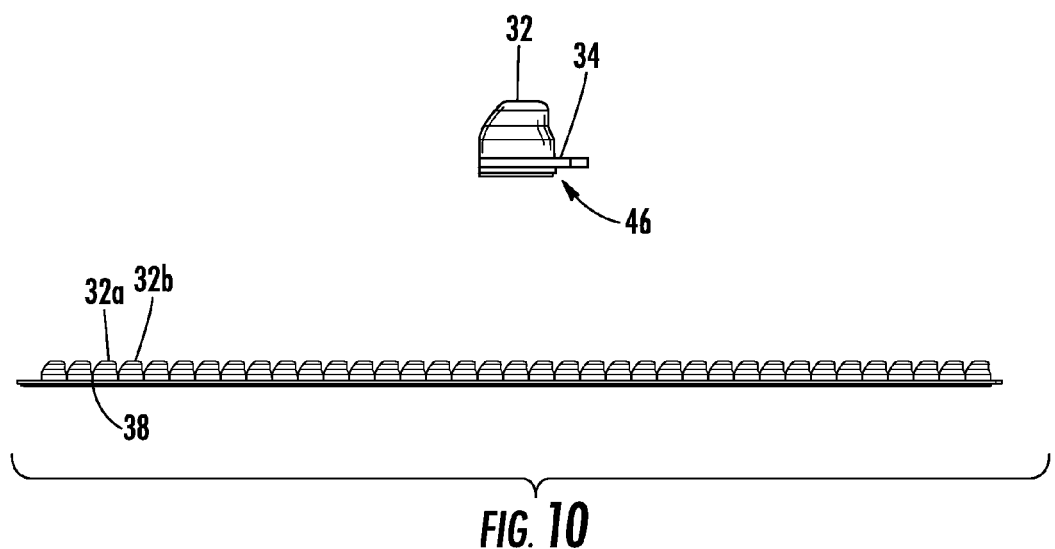
FIG. 10 is a side elevation view of the quad sheet of the collating strip for plugs of FIG. 9 and an enlarged elevation view of an end plug thereof.
Figure 11:
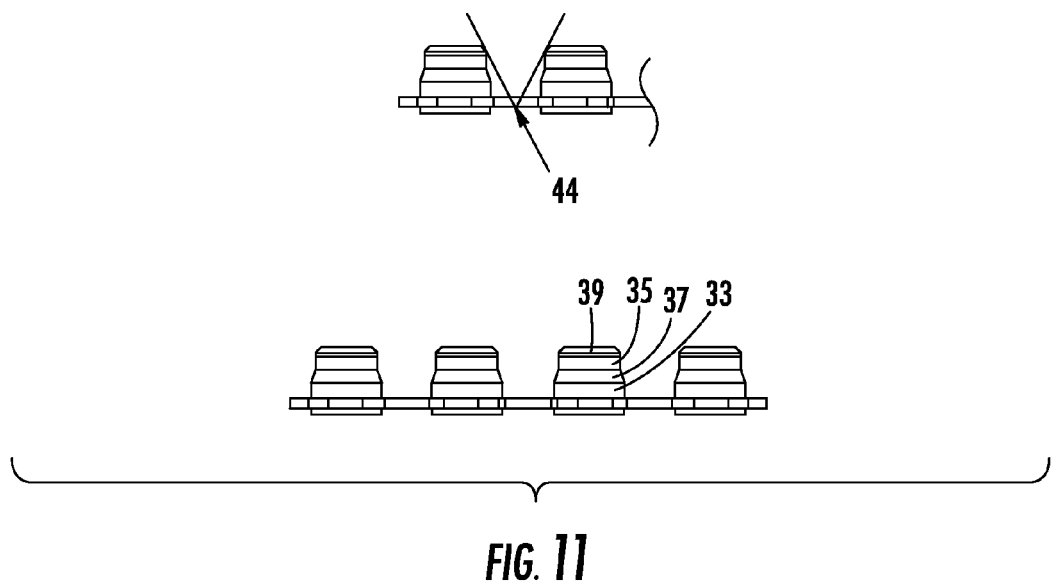
FIG. 11 is an end elevation view of the quad sheet of collated plug strips of FIG. 9 and an enlarged elevation view of plugs from adjacent strips.

As shown particularly in FIGS. 5, 10 and 11, the plug 32 may include an upper enlarged cylindrical portion 33, a lower reduced cylindrical portion 35 and a tapered transition portion 37 between the upper enlarged cylindrical portion 33 and the lower reduced cylindrical portion 35 The lower reduced cylindrical portion 35 may have a taper 39 at its end portion. The outer face of the enlarged cylindrical portion 35 is the external end having a finished end surface 41 and the end of the lower cylindrical portion 37 is the insertion end 43. See U.S. Pat. No. 8,104,248, the entire disclosure of which is incorporated by referral herein in its entirety, for a disclosure of various types of plugs that may be used.

Figure 6:
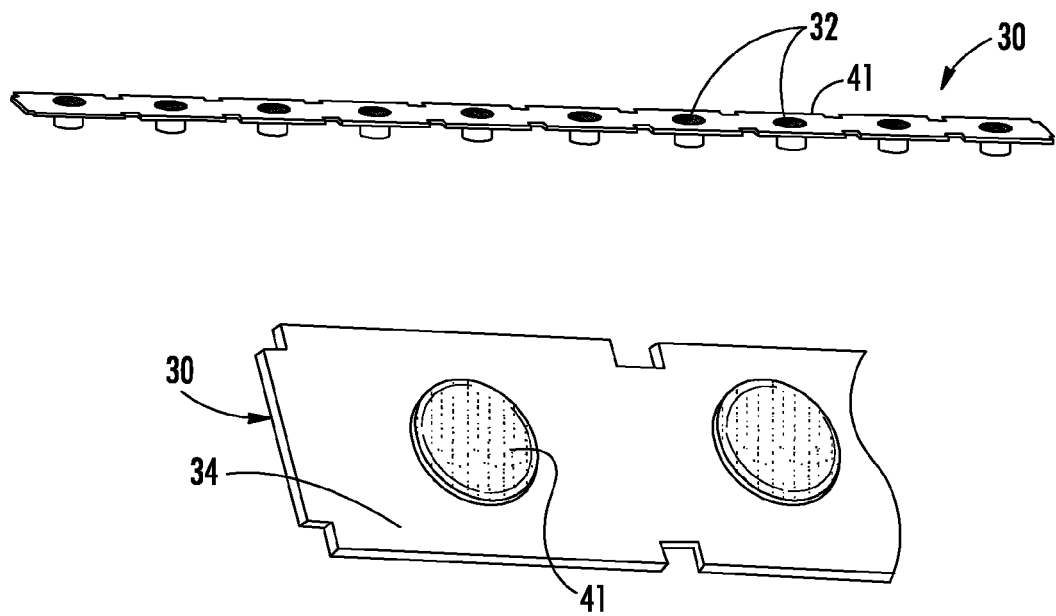
FIG. 6 shows the collating strip of FIG. 5 from the top side.

FIG. 5 shows the insertion end 43 of each plug 32 projecting above the bottom surface 45 of the strip 34, which allows easy insertion into a recess or bore in trim or a similar surface material. FIG. 6 depicts the reverse or top side of the FIG. 5 view, showing the "finished" end surface 41 of the plugs 32. As shown, the finished end 41 may project very slightly beyond the surface of the strip 34, but this is not a necessary relationship. The individual plugs 32 can be inserted into a trim recess and the strip 34 can be dislodged without contact with the finished end of the plug 32. An embodiment may be provided wherein a removable covering or wrapper extending along the side of the substrate with the finished ends of the plugs to protect the finish.

The FIGS. 5 and 6 embodiment features engagement of the plugs 32 with the strip 34 via a relatively light frictional engagement within the strip perforations. The perforations 26 engage the upper enlarged cylindrical portion 33 of the plug 30. Additional embodiments may be provided which employ a mild adhesive either alone or in combination with frictional forces to engage or assist engagement of the plugs with the substrate.

Figure 7:
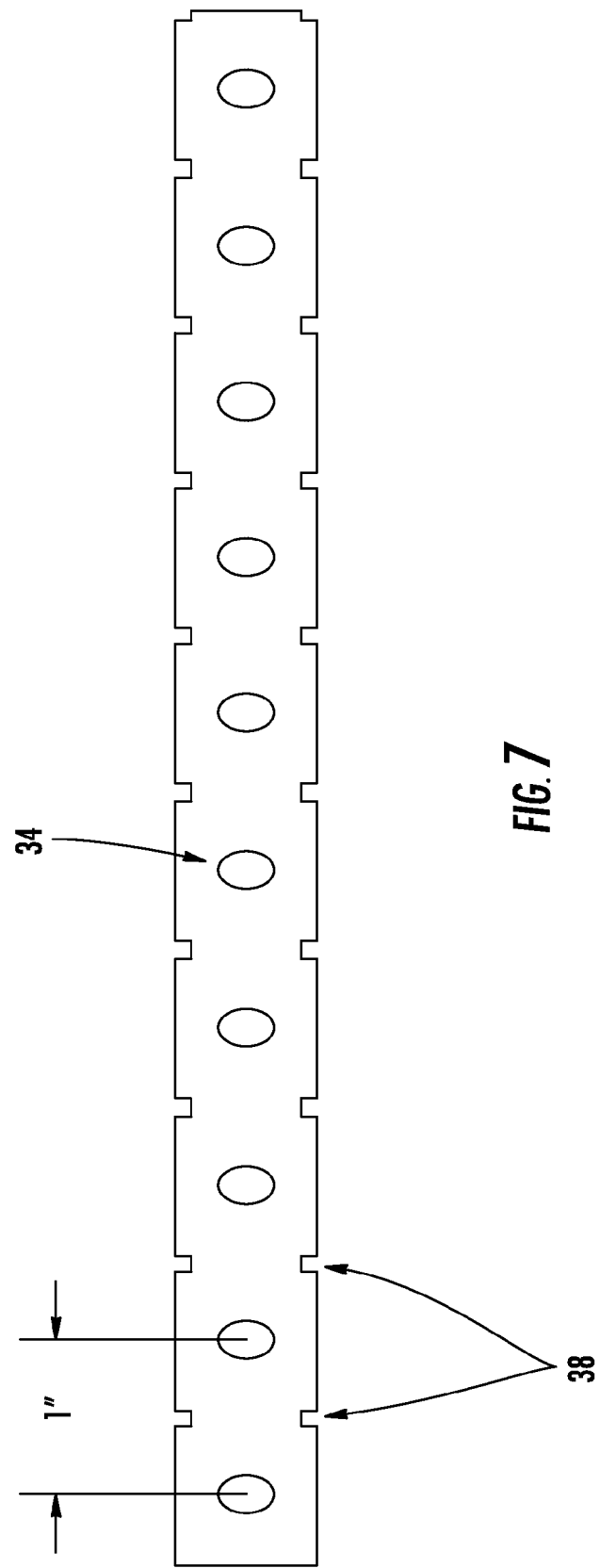
FIG. 7 is a plan view of the strip of FIGS. 5 and 6, showing the spacing and use of edge notches as registry locations for use with an installation tool.

FIG. 7 shows a plan view of the notched strip of FIGS. 5 and 6. This view shows a spacing distance of approximately 1.0 inch between the centers of each successive plug 32 along the strip 34. However, the spacing can be varied as desired for different sized plugs and different configurations of substrate. A preferred range of distances is 0.20 inches to 2.0 inches, with a particularly preferable distance of approximately 0.5 inches. As shown and discussed above, the registry notches 38 are disposed along each longitudinal edge of the substrate 34 in an opposing configuration. These registry notches 38 each have substantially the same size and shape, but these characteristics may vary, for instance, for different configurations of attachment and feeding tools. The strip 30 may come wrapped in a coil configuration for advantageous packaging, storage and use.

Figure 8:
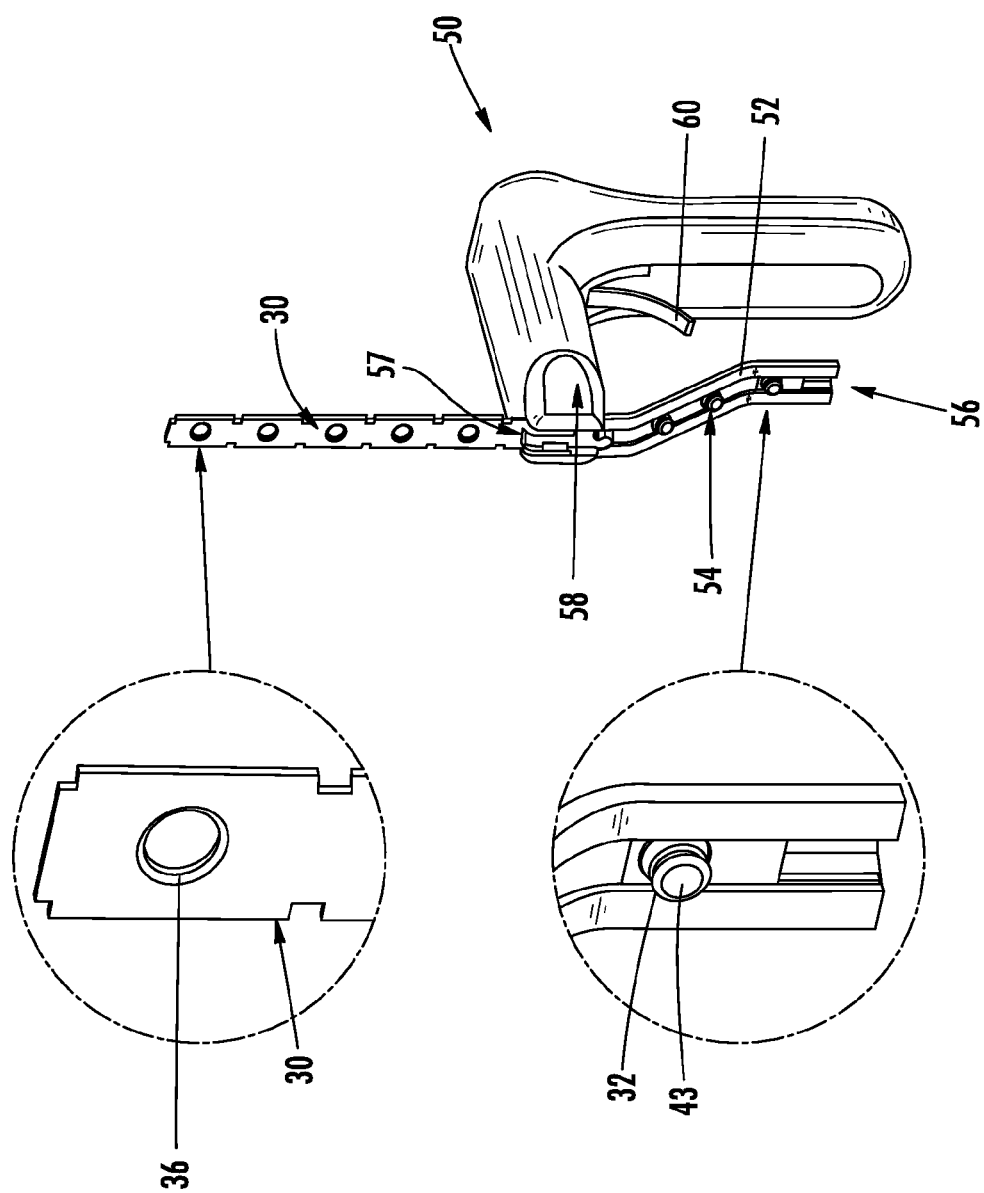
FIG. 8 shows a hand held installation tool for use with the disclosed collating strip for plugs and the corresponding method of use.

FIG. 8 depicts an embodiment of a semi-automatic installation device or tool 50 for use with the disclosed strip, like that depicted as reference numeral 30. The installation device 50 includes an elongated track 52 that defines a front opening 54 extending the entire length of the track. Also defined by the track 52 are a lower opening 56 and an upper opening 57, each sized and shaped to allow an end of the strip 30 to pass through. The track 52 is preferably a rigid material such as a metal or a hard plastic. The track 52 is configured to receive and slidably maintain the strip 30 with the insertion ends 15 of the plugs 32 within the front opening 54, as shown in the lower exploded window in FIG. 8.

The installation device 50 also includes an advancement and attachment mechanism, positioned within the housing portion shown generally as reference numeral 58 in FIG. 8. The attachment mechanism includes a plunger or similar item (not shown) that reciprocates generally perpendicular to the strip portion in front of the plunger. One embodiment of the device 50 may include an advancement mechanism with a toothed-wheel configuration. The teeth of the wheel are sized, shaped and positioned generally to engage with the notches 38 on the strip substrate 34.

A user typically feeds the strip 30 upward through the track 52 until the teeth engage with a front set of the notches 38. When a plug 32 is advanced in front of the plunger, a user can position the plug 32 within a trim recess or bore, and then pull the device trigger 60 which effects reciprocation of the plunger outward, thereby dislodging the plug 32 from the substrate 34 and installing it within the recess. Thereafter, the toothed wheel rotates upward (clockwise in the view of FIG. 8) a predetermined angle, advancing the strip 30 upward into position with the next plug 32 in front of the plunger ready for the next installation. As shown in the upper exploded circle in FIG. 8, the empty strip 34 material exits the upper end of the track 52. The described toothed wheel and plunger is a non-limiting example of an advancement and attachment mechanism that is suited for use with the disclosed strip 30.

Figure 9:
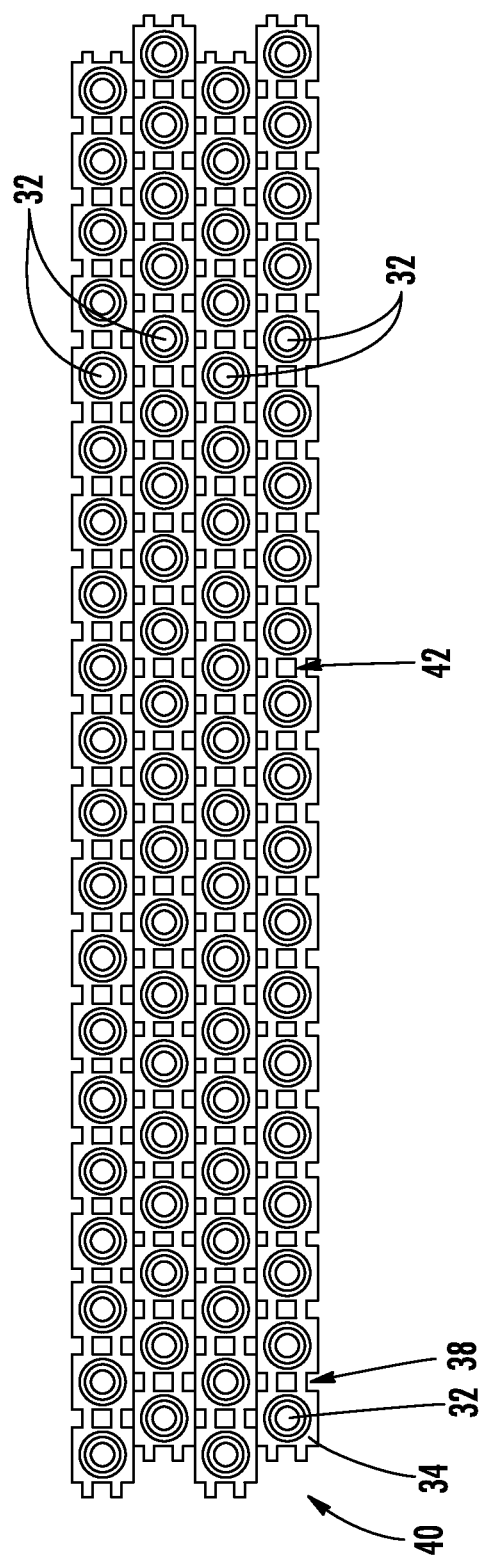
FIG. 9 is an embodiment of the disclosed collating strip for plugs in a quad sheet form.

FIG. 9 shows a plurality of collating plug strips 30 joined at adjacent longitudinal edges to form a sheet 40. Here, the sheet 40 includes four parallel longitudinally extending strips 30 joined in an alternating offset alignment (i.e., a "quad sheet"). It is to be understood that any number of rows may be provided. Each strip 30 is attached to an adjacent strip 30 with the plugs 32 of each respective adjacent strip longitudinally aligned with the intermediate portion of strip 34 between plugs 32 of the adjacent strip. This described configuration likewise results in the registry notches 38 and relief notches 42 in the strip 34 being longitudinally offset from the corresponding notches of the adjacent strip(s). As shown, alternating strips 30 in the sheet 40 are substantially longitudinally aligned. FIG. 9 also shows a non-limiting example of the dimensions of an embodiment of the sheet 40 (in inches).

The side elevation view of the sheet 40 shown in FIG. 10 depicts the alternating arrangement of adjacent strips 30. The end strip plugs 32a are longitudinally offset from the adjacent (rear) strip plugs 32b. The enlarged portion of a plug 32 (detail B) shows preferred dimensions and a plastic retaining element 46 which may be included for assisting securement of a plug 32 within a perforation in the substrate 34.

The registry notches 38 are positioned to facilitate incremental and consistent longitudinal feeding of a strip 30 with an automatic or semi-automatic attachment tool. The relief notches 42 are positioned between each successive plug 32 in a strip 30 to improve flexibility of the strip and/or sheet 40.

As shown in the enlarged end view of FIG. 11 (detail A), the sheet 40 can be manufactured with a V-notch 44 or similar notch in the substrate 34 at the joined interface between longitudinal edges of adjacent strips 30 in the sheet 40. The V-notch 44 assists in facile detachment of adjacent strips by tearing or peeling off. FIG. 11 also indicates a preferred geometry and dimensions.

With reference to FIG. 12, prior to use of a collated strip, an end strip 30 is typically be detached (by "peeling" or "tearing") from the adjacent strip in the sheet 40 and fed into an installation device (like that depicted previously as reference numeral 50) or used for hand installation.

The four-strip configuration of the sheet 40 depicted in FIGS. 9 and 12 is particularly advantageous for manufacturing, packaging, transporting, pre-use handling and strip detachment.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A collated strip of plugs for insertion into a hole in a surface, comprising:
   a. an elongate strip having a plurality of perforations spaced along its longitudinal length; and
   b. a first plug positioned in one of said perforations, the first plug having an insertion end and an external end,
   c. a second plug positioned in another one of said perforations, the second plug having an insertion end and an external end, wherein
   the external end of each of the first and second plugs has a respective outer surface with a grain configuration, and the first and second plugs are positioned such that the first and second plugs have substantially the same orientation of their grain configuration relative to one another while positioned in their respective perforations.

2. The collated strip of claim 1 wherein said strip has opposite longitudinally extending side edges having sets of opposed notches.

3. The collated strip of claim 1 wherein the first and second plugs are held in their respective perforations by frictional engagement with side edges of the perforation.

4. The collated strip of claim 1 wherein the strip defines an upper surface and opposite lower surface and the outer surface of the external end of each of the first and second plugs is offset outwardly from the upper surface of said strip.

5. The collated strip of claim 1 wherein said perforations are circular.

6. The collated strip of claim 1 wherein said perforations are longitudinally spaced between about 0.2 inch and 2.0 inches.

7. The collated strip of claim 1 wherein said elongated strip is a flexible plastic.

8. The collated strip of claim 1, wherein the insertion end of each plug projects from the strip.

9. The collated strip of claim 1, comprising a relief opening between successive perforations in the strip.

10. The collated strip of claim 1, wherein the insertion end defines a substantially circular surface with a diameter $D_1$ and the external end defines a substantially circular surface with a diameter $D_2$ that is greater than $D_1$.

11. A sheet of collated strips of plugs for insertion into a hole in a surface, comprising:
   a. a sheet having multiple spaced rows of longitudinally spaced perforations,
   b. a first plug positioned in one of said perforations in a first row and a second plug positioned in another of said perforations in the first row, each of the first and second plugs having a respective insertion end and a respective external end,
wherein said first row is separable from the sheet to provide a single strip having one longitudinal row of spaced perforations;
wherein the external end of the first plug has an outer surface with a grain configuration and the external end of the second plug has an outer surface with a grain configuration, and the first and second plugs are arranged such that each plug has substantially the same orientation of its grain configuration relative to said strip.

12. The sheet of claim 11 wherein said sheet has a longitudinal extending notch extending between adjacent rows of perforations.

13. The sheet of claim 11 wherein said perforations in one row are longitudinally spaced such that they are longitudinally between perforations in an adjacent row.

14. The sheet of claim 12 wherein each row has sets of opposed notches positioned along an axis on either side of said perforations.

15. The sheet of claim 11 wherein the first and second plugs are held in their respective perforation by frictional engagement with the edge of the perforation.

16. The sheet of claim 11, wherein each row has a plurality of plugs with each plug positioned in a respective hole.

17. The sheet of claim 11, wherein a plug is positioned in each of said perforations.

18. The sheet of claim 11, comprising a relief opening intermediate adjacent spaced apertures.

19. The sheet of claim 18, wherein a relief opening is intermediate each spaced aperture.

20. A method of inserting plugs into holes in a surface, comprising:
  a. providing an elongated strip having a plurality of spaced perforations and a plurality of plugs with a plug positioned in each of the spaced perforations, each of said plurality of plugs having an insertion end and an external end, each external end having an outer surface with a grain configuration, and the plurality of plugs being arranged such that each plug has substantially the same orientation of its grain configuration relative to one another while positioned in their respective perforations,
  b. positioning said strip over said surface so that the insertion end of a first plug is aligned with a first hole,
  c. pushing the first plug at least partially into the hole,
  d. removing the strip from the first plug,
  e. positioning said strip over said surface so that the insertion end of a second plug is aligned with a second hole, and
  f. pushing the second plug at least partially into the second hole.

21. The method of claim 20 wherein the steps of pushing the first plug and pushing the second plug into the respective first and second holes comprises pushing the first and second plugs to an installed position wherein the respective external ends are substantially flush with the surface.

22. The method of claim 21, comprising pushing the plug into the installed position after removing the strip.

23. The method of claim 20, wherein the first and second plugs have substantially the same orientation of their grain configuration relative to the surface when pushed at least partially into the respective holes.

* * * * *